Figure 4:
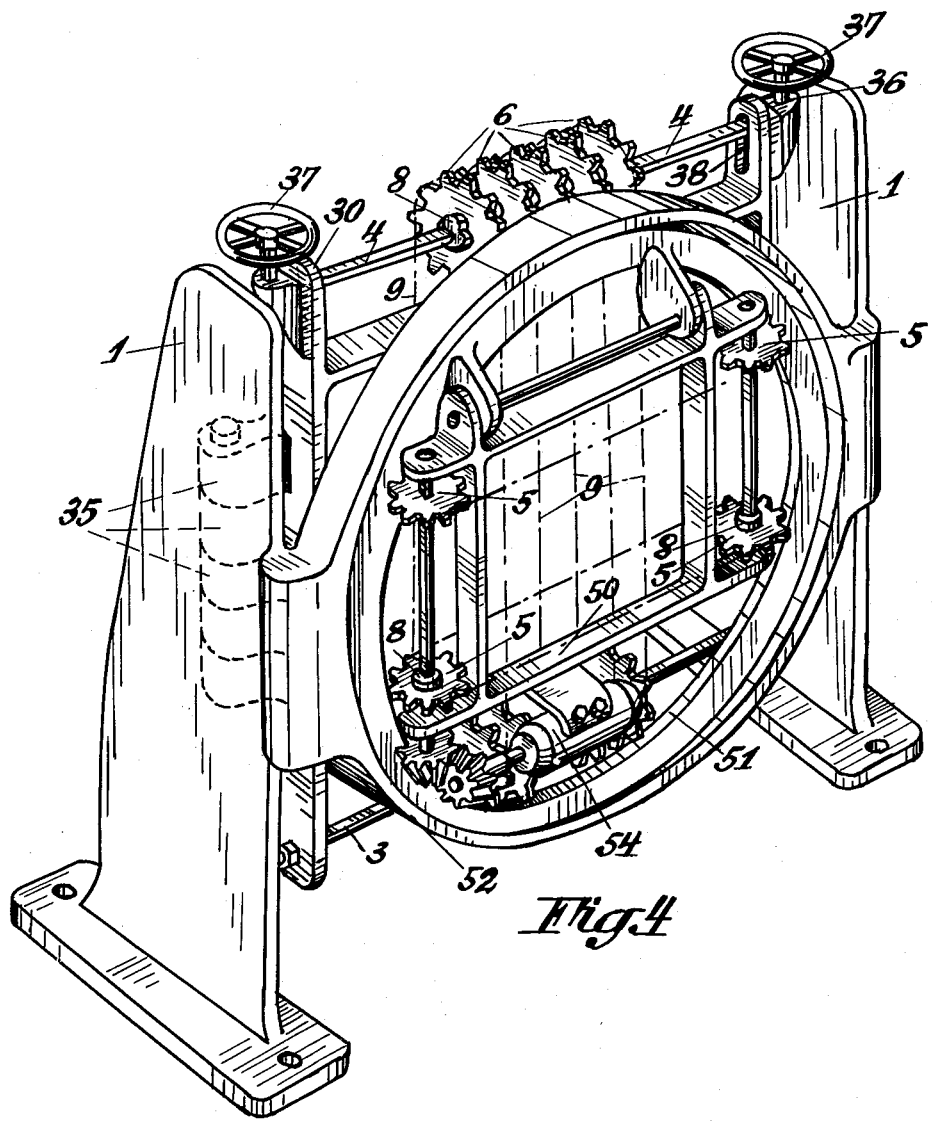

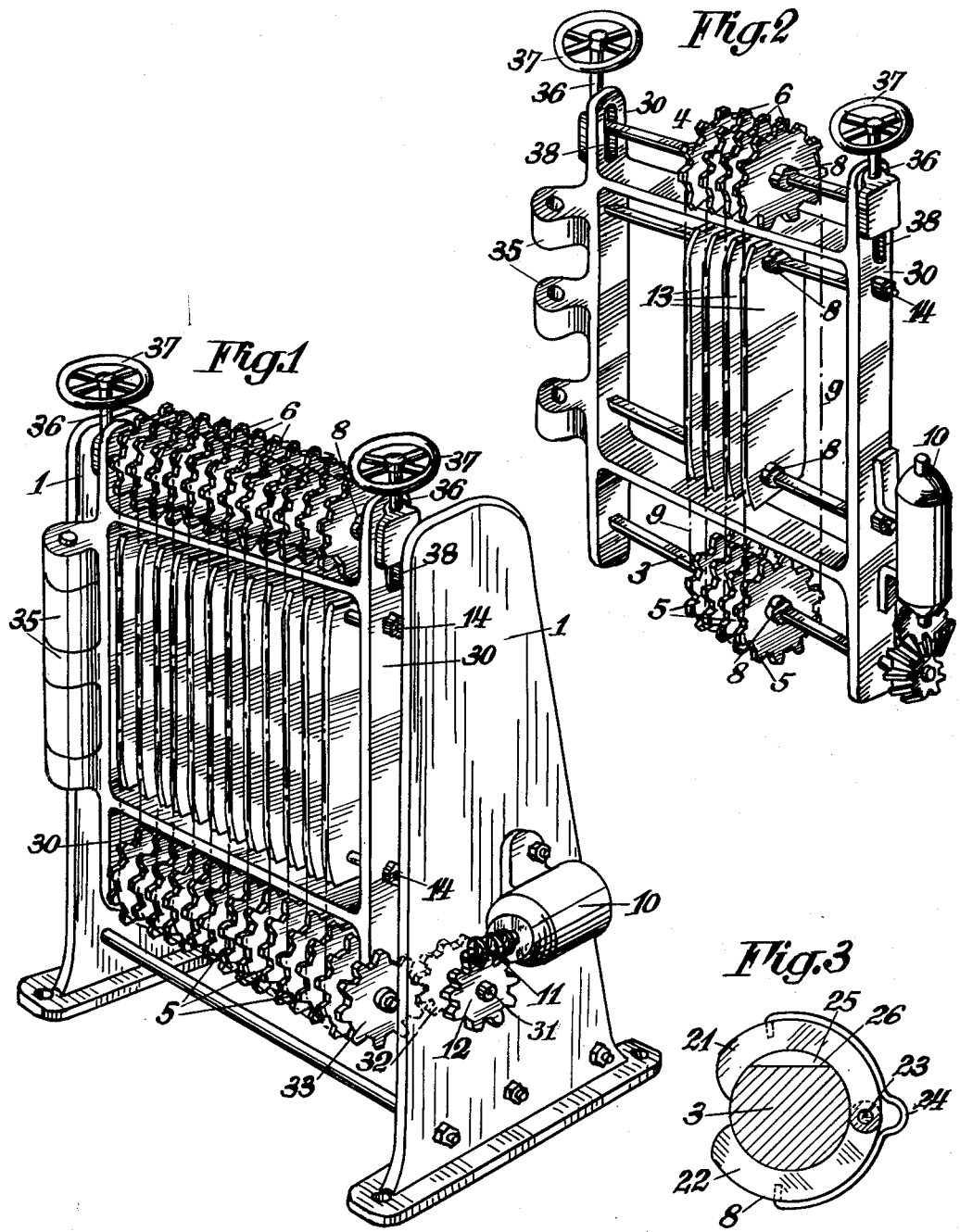

Oct. 6, 1953    F. NEUHAUSER ET AL    2,654,404
MULTIPLE CHAIN SAW MACHINE FOR CUTTING TIMBER
Filed Feb. 19, 1951    3 Sheets-Sheet 3
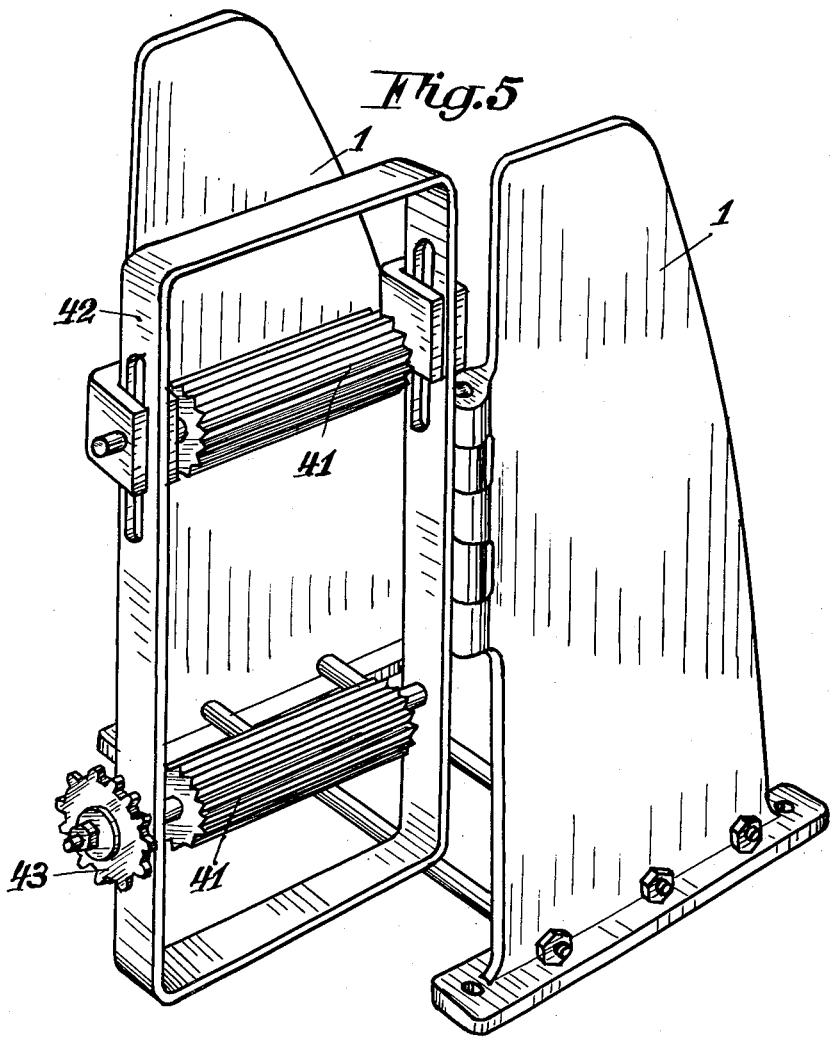
INVENTORS:
FRANZ NEUHAUSER AND
RUDOLF PRINZ
BY Patented Oct. 6, 1953

2,654,404

UNITED STATES PATENT OFFICE 2,654,404

MULTIPLE CHAIN SAW MACHINE FOR CUTTING TIMBER

Franz Neuhauser and Rudolf Prinz, Vienna, Austria

Application February 19, 1951, Serial No. 211,666
In Austria February 23, 1950

12 Claims. (Cl. 143—32)

This invention relates to a machine for cutting timber.

In most cases frame saws are used for sawing tree trunks. It has also been suggested, however, to cut by means of one or several endless chain saws, which are mounted in parallel planes. In the previous saws of this type the saw chains are built into a stationary frame and each saw chain is held by a separate suspension device, which embraces the upper sprocket wheel with a fork and ends in a threaded shaft extending through slots in the upper beam of the frame. Owing to this arrangement the fitting and exchange of each saw chain requires the separation of the entire holding device for each chain. This is complicated and time wasting, and involves difficulties in assembling.

The main object of the invention is to enable the simple and quick fitting and exchange of the saw chain. For this purpose a bearing frame, which can be swung out, is mounted to the main frame. Serving for fixing the saw chains, this bearing frame is provided with a drive motor, or with a coupling gear, for driving one sprocket wheel shaft through a toothed-wheel gearing, or the like. This motor or coupling gear is fitted to the bearing frame and pivotally movable together with it. The structure of the machine permits of the fitting and exchange of the saw chains when the bearing frame is swung out so that these operations are considerably facilitated because they are unhindered by stationary frame parts and because the saw chains can be mounted completely in the swung-out bearing frame, to assume their working position by the inward swing movement of the bearing frame.

To enable the sawing of round profiles (round bars, posts) with the machine according to the invention, a modification of the invention provides for a secondary chain-set frame beside the primary bearing frame. This secondary chain-set frame is used when the main bearing frame is swung out. Whereas it is known to cut timber trunks by means of two band saws arranged at right angles to each other, these known machines are suitable only for sawing boards or laths, not for sawing round profiles (round bars, posts, and the like).

To obtain, on the one hand, a proper spacing of the sprocket wheels for the saw chains, and, on the other hand, to enable an alteration of the widths of cut, when required, without removal of the sprocket wheels, the invention provides washers, which can be fitted radially on the sprocket shafts between the sprocket wheels. Hence, these washers can be laterally pulled off the shafts when the width of cut is to be altered.

It has been suggested that in sawing machines in which chains serve as sawing elements, one of the sprockets associated with a chain should be displaceable relative of the other sprocket, for tightening the chain.

In the known sawing machines referred to in the first place hereinbefore, the threaded shafts of the chain suspending devices are vertically displaceable in slots of the upper cross beam of the frame and carry tightening nuts, which are tightened for tightening the saw chains. Owing to the suspension of each sprocket wheel in a form at the upper crossbeam of the frame (as described above), it is impossible in these known machines to fit or exchange the chain without removing and taking apart the suspending devices from the frame. According to a modification of the invention the devices for adjusting the sprocket wheels are attached not to the upper cross beam of the frame but to the side members of the frame, laterally of the sprocket wheels.

In the drawings several embodiments of the machine according to the invention are illustrated by way of example, Fig. 1 being a perspective view showing the entire machine, Fig. 2 a view showing the bearing frame with direct motor drive, in order to illustrate in particular the device for displacing one of the sprockets shafts.

Fig. 3 shows a sprocket-wheel washer.

Fig. 4 a view of the machine with a secondary chain-set frame for the sawing of profiles, and Fig. 5 a swing frame for the feed mechanism.

The main frame of the machine comprises two uprights 1, of sheet steel or cast iron. Two shafts 3, 4 are journalled by means of ball bearings in this main frame and carry the sprocket wheels 5, 6. The shaft 4 is adjustably mounted so as to be displaceable parallel to the shaft 3, to enable the tightening of the chains.

The number of sprocket wheels 5, 6 provided depends in each case on the desired number of cuts, and the latter on the thickness of the timber to be sawn. The sprocket wheels are readily fitted and axially slidable on the shafts. For sawing different thicknesses, washers 8 of the corresponding thickness, are stuck on the shaft between the several sprocket wheels. These washers are so constructed that they can be exchanged or removed without removal of the sprocket wheels from the shaft. The sprocket wheels and washers are fixed in position by means of threaded nuts provided at one end of the shafts. An embodiment of the washers is shown in Fig. 3. The washer shown there consists of two ring sections 21, 22, connected by a hinge pin 23. The ring sections are subjected to the force of a steel spring 24, which presses them towards each other. This spring preferably embraces partially the ring sections, as is shown in Fig. 3.

The washers to be fitted on the driven shaft 3 have a lug 25, e. g., of segment shape, so that they are turned along with said shaft just as the sprocket wheels, whereby friction between the sprocket wheels and the washers is avoided.

To enable the use of endless saw chains and their quick exchange, the saw chain units are fitted in a separate bearing frame. A hinge structure 35 of corresponding strength permits of the pivotal movement of the bearing frame 30 out of the main frame. After the shaft 4 has been displaced towards the shaft 3, the saw chains are easily removable from the sprocket wheels for exchange. To enable the displacement of the shaft 4, screw bolts 36 are mounted preferably at the outside of the side members of the bearing frame 30. When the bolts are being turned by means of hand wheels 37, nuts 38 are moved up or down. The shaft 4 is mounted to the nuts 38 or to blocks connected therewith. For removal of the saw chains, the washers 8 are preferably pulled off the shaft 4, to provide for more play of the saw chains. The bearing frame 30 being swung out, the chain saws are subsequently pulled over the side members of said bearing frame and the adjusting devices 36 to 38 fixed thereto. After the chains have been exchanged, the bearing frame is swung back into its working position and located by suitable fixing elements.

To enable the swinging-out of the bearing frame 30, this arrangement requires a separation between the main driving shaft 31 and the chain driving shaft 3. The connection of these two shafts is effected by a pair of gears, one gear 32 of which is mounted on the main shaft 31, the other one, 33, on the sprocket shaft 3. The two gears mesh after the bearing frame has been moved into its working position. The shaft 31 is journalled in the main frame 1 and is driven by a motor 10 through the worm 11, and worm gear 12.

Where a direct motor drive is employed, as shown in Fig. 2, the drive motor may form a unit with the bearing frame and be pivotally movable therewith. In this case there is no need for separating the driving shafts.

Just as a set of chains, the entire feed mechanism (corrugated rollers 41 etc.) can be combined in a swing frame 42, which is pivotally connected by means of a corresponding hinge structure to the main frame, as shown in Fig. 5. One of the corrugated rollers is driven by a gear 43, which comes into mesh with the driving gear (not shown) after the swing frame 42 has been moved into its working position. In the case of a direct motor drive the drive motor is mounted on the swing frame 42 and pivotally moved with it.

Where a secondary chain set frame 50, with one or several saw chain units, is adjustably arranged at the main frame, before or behind the primary bearing frame 30 (with reference to the feed direction), as shown in Fig. 4, profiles can be sawn with the combined machine. The secondary chain frame is mounted on an annular base plate 51 so that it can be swung out. Together with the secondary chain-set frame, this base plate slides in an annular counter member of the main frame. When the secondary frame is adjusted, e. g., at right angles to the direction of cut of the primary bearing frame, joists, scantlings, or laths, etc., can be sawn in one operation. The drive of the sprocket shaft is effected by a motor 54 arranged on the secondary frame.

This combined machine, comprising a rotatably arranged secondary frame and only two saw chain units, is capable of sawing round sections, posts, round bars, or the like, when the main bearing frame is swung out.

What we claim is:

1. Sawing apparatus comprising, in combination, a main frame; a secondary frame having a free side and being connected to said main frame for movement with respect thereto into and out of an operative position in said main frame where said free side of said secondary frame is located closely adjacent to a part of said main frame; a pair of saw chain support means turnably mounted on said secondary frame and being movable therewith into and out of said operative position thereof, said pair of support means being mounted on said secondary frame for respective movement toward and away from each other so that a saw chain may be removed over said free side of said secondary frame after the latter is moved out of said operating position thereof and after movement of said pair of support means respectively toward each other; and drive means associated with at least one of said support means for turning the same so as to move a saw chain supported by said pair of support means.

2. Sawing apparatus as defined in claim 1 and wherein said drive means is at least partially mounted on said main frame.

3. Sawing apparatus as defined in claim 1 and wherein said drive means is mounted only on said secondary frame.

4. Sawing apparatus comprising, in combination, a main frame; a secondary frame having a free side and being pivotally connected to said main frame for turning movement with respect thereto into and out of an operative position in said main frame where said free side of said secondary frame is located closely adjacent to a part of said main frame; a pair of parallel shafts turnably mounted in said secondary frame and being movable therewith into and out of said operative position thereof; adjusting means operatively connected to one of said shafts for moving the same toward and away from the other of said shafts; a plurality of sprocket wheels mounted on each of said shafts and adapted to support saw chains; and drive means associated with said other shaft for turning the same, whereby, when said secondary frame is located out of said operation position thereof and said one shaft is moved toward the other shaft by said adjusting means, one or more saw chains may be removed from said sprocket wheels and over said free side of said secondary frame without removal of said shafts from said secondary frame.

5. Sawing apparatus as defined in claim 4 and wherein said adjusting means comprises at least one screw member turnably mounted, for rotation about its axis, on said secondary frame; and nut means associated with said screw member for movement therealong upon turning of the same, said nut means being connected with said one shaft to move the latter upon turning of said screw member.

6. A sawing apparatus as defined in claim 4 and wherein a plurality of washers are mounted on said shafts between said sprocket wheels to maintain the latter in a predetermined, spaced relationship with respect to each other, each of said washers comprising a pair of hingedly connected substantially arcuate members and a spring connected to said arcuate members for urging the same toward each other.

7. A sawing apparatus comprising, in combination, a first frame; a second frame mounted on said first frame for movement with respect thereto into and out of an operative position in said first frame, said second frame having a front side and a rear side; a first pair of saw chain support means turnably mounted on said second frame and being movable therewith into and out of said operative position thereof; a first drive means associated with at least one of said first pair of support means for turning the same so as to move a saw chain supported by said first pair of support means; a third frame mounted on said first frame for movement with respect thereto into and out of an operative position in said main frame, said third frame, when it is in said operative position thereof, being located opposite one of said sides of said second frame; a second pair of support means turnably mounted on said third frame and being movable therewith into and out of said operative position thereof; and a second drive means mounted on said third frame for movement therewith and being operatively connected to said second pair of support means for turning the same so as to move a saw chain supported by said second pair of support means.

8. A sawing apparatus as defined in claim 7 and wherein said first pair of support means are mounted on said second frame for turning movement about a pair of axes which are perpendicular to the axes about which said second pair of support means turn.

9. A saw apparatus as defined in claim 7 and wherein said second and third frames are turnably mounted on said first frame for movement about axes which are perpendicular to each other.

10. A sawing apparatus comprising, in combination, a main frame; a secondary frame turnably mounted at one side thereof on said main frame for movement with respect thereto into and out of an operative position in said main frame, said secondary frame having a free side opposite said one side thereof; a pair of parallel shafts turnably mounted on said secondary frame respectively adjacent opposite ends of said free side thereof and being substantially normal to said sides thereof; adjusting means operatively connected to one of said shafts for moving the same toward and away from the other of said shafts; drive means associated with said other shaft for turning the same; and a plurality of sprocket wheels mounted on said shafts and adapted to support at least one saw chain for movement upon turning of said other shaft by said drive means, whereby, when said shafts are moved toward each other by said adjusting means and said secondary frame is out of said operative position thereof, a saw chain may be removed from the sprocket wheels supporting the same and over said free side of said secondary frame.

11. A sawing apparatus comprising, in combination, a main frame having two supports spaced from each other; a secondary frame having a pair of opposite edges and being pivotally mounted along one of said edges thereof on one of said main frame supports for turning movement between an operative position with the other of said edges located adjacent to the other of said main frame supports and an inoperative position with said other edge of said secondary frame turned away from and thus spaced from said other main frame support; and a saw chain mounted on said secondary frame, encircling the same, and being removable over said other edge thereof so as to be prevented from removal when said secondary frame is in said operative position thereof and so as to be freely removable when said secondary frame is in said inoperative position thereof with said other edge of said secondary frame spaced from said other main frame support.

12. Sawing apparatus comprising, in combination, a first frame part; and a second frame part mounted on said first frame part and having at least one free edge so that a saw chain mounted about said second frame part may be removed therefrom over said free edge thereof.

FRANZ NEUHAUSER.
RUDOLF PRINZ.

References Cited in the file of this patent

UNITED STATES PATENTS

| Number | Name | Date |
|---|---|---|
| 76,471 | Knowlton | Apr. 7, 1868 |
| 279,780 | Magaw | June 19, 1883 |
| 1,642,145 | Ferguson | Sept. 13, 1927 |

FOREIGN PATENTS

| Number | Country | Date |
|---|---|---|
| 113,501 | Austria | June 10, 1929 |